(12) United States Patent
Yoon

(10) Patent No.: US 9,140,226 B2
(45) Date of Patent: Sep. 22, 2015

(54) DME COMMON-RAIL FUEL SUPPLY APPARATUS AND METHOD

(75) Inventor: Sangil Yoon, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 514 days.

(21) Appl. No.: 13/528,157

(22) Filed: Jun. 20, 2012

(65) Prior Publication Data

US 2013/0118452 A1 May 16, 2013

(30) Foreign Application Priority Data

Nov. 20, 2011 (KR) .................. 10-2011-0119071

(51) Int. Cl.
| | |
|---|---|
| F02M 41/00 | (2006.01) |
| F02M 63/02 | (2006.01) |
| F02M 21/02 | (2006.01) |
| F02D 19/02 | (2006.01) |
| F02D 41/38 | (2006.01) |
| F02D 41/00 | (2006.01) |

(52) U.S. Cl.
CPC .......... *F02M 63/0225* (2013.01); *F02D 19/022* (2013.01); *F02D 19/023* (2013.01); *F02D 19/027* (2013.01); *F02D 41/0027* (2013.01); *F02D 41/3863* (2013.01); *F02M 21/0212* (2013.01); *F02M 21/0245* (2013.01); *F02D 2200/0602* (2013.01); *F02D 2200/0606* (2013.01); *F02M 21/0287* (2013.01); *F02M 2200/953* (2013.01); *Y02T 10/32* (2013.01)

(58) Field of Classification Search
CPC .... F02M 69/002; F02M 69/005; F02M 55/02
USPC ........ 123/445, 446, 456, 457, 461, 464, 468, 123/478, 480
See application file for complete search history.

(56) References Cited

U.S. PATENT DOCUMENTS

2011/0056464 A1    3/2011    Chang

FOREIGN PATENT DOCUMENTS

| JP | 63-166661 | 10/1988 |
|---|---|---|
| JP | 8-338339 A | 12/1996 |
| JP | 11-336634 A | 12/1999 |
| JP | 2002-61542 A | 2/2002 |
| JP | 2002-276473 | 9/2002 |
| JP | 2005-139910 A | 6/2005 |
| KR | 10-2006-0063071 A | 6/2006 |

*Primary Examiner* — John Kwon
(74) *Attorney, Agent, or Firm* — Morgan, Lewis & Bockius LLP

(57) ABSTRACT

A dimethyl ether (DME) common-rail fuel supply apparatus, may include a fuel pump fluid-connected to a fuel tank and a common rail and supplying DME fuel supplied via a fuel supply line from the fuel tank to the common rail, an injector receiving the DME fuel from the common rail and injecting the DME fuel at a predetermined pressure, a detector disposed on a fuel return line fluid-connecting the injector and the fuel tank to collect a fuel returned from the injector to the fuel tank, and a fuel amount control valve returning a portion of a fuel in the fuel pump to the fuel return line connected to the injector according to a value measured by the detector.

3 Claims, 5 Drawing Sheets

DME COMMON-RAIL FUEL SUPPLY APPARATUS AND METHOD

CROSS-REFERENCE TO RELATED APPLICATIONS

The present application claims priority to Korean Patent Application Number 10-2011-0119071 filed Nov. 15, 2011, the entire contents of which application is incorporated herein for all purposes by this reference.

BACKGROUND OF THE INVENTION

1. Field of the Invention

The present invention relates to a dimethyl ether (DME) common-rail fuel supply apparatus and method, and more particularly, to a DME common-rail fuel supply apparatus and method capable of stably maintaining a liquefied state of DME.

2. Description of Related Art

Recently, with the global warming and the rising gasoline prices, all the countries of the world pay attention to DME as alternative fuel which is capable of maintaining the same power level as diesel oil used for partially-changed diesel engines which are being currently mass-produced and reducing particulate materials (PM) and exhaust gas.

Accordingly, a DME common rail as illustrated in FIG. 1 has been applied to develop a dedicated engine. However, there are difficulties in constructing a system, because evaporation (in the case of over −25 degrees or below 6 atmosphere pressures) occurs well due to fuel properties. That is, when the properties of the DME fuel are not maintained, a part such as an injector 4 may be reduced in durability.

FIG. 2 is a graph showing a temperature-pressure curve of the DME fuel. Referring to FIG. 2, it can be seen that the DME fuel maintains a liquefied state around 40 to 45 degrees and 10 bar.

Typically, however, a temperature measured at a point a of FIG. 1 is equal to or less than 90 degrees, and pressure measured at the point a is equal to or less than 3 Mpa. Therefore, referring to the temperature-pressure curve of FIG. 2, it can be seen that the evaporation possibility of the DME fuel is high. Accordingly, there is demand for an apparatus for maintaining a liquefied state of the DME fuel by overcoming such a problem.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a DME common-rail fuel supply apparatus and method capable of increasing the flow rate of fuel to lower the average temperature of the fuel and maintaining the properties of fuel in a liquefied state, thereby improving the durability of an engine.

In an aspect of the present invention, a dimethyl ether (DME) common-rail fuel supply apparatus, may include a fuel pump fluid-connected to a fuel tank and a common rail and supplying DME fuel supplied via a fuel supply line from the fuel tank to the common rail; an injector receiving the DME fuel from the common rail and injecting the DME fuel at a predetermined pressure; a detector disposed on a fuel return line fluid-connecting the injector and the fuel tank to collect a fuel returned from the injector to the fuel tank; and a fuel amount control valve returning a portion of a fuel in the fuel pump to the fuel return line connected to the injector according to a value measured by the detector.

The fuel amount control valve is disposed on a bypass line that fluid-connects the fuel pump and the fuel return line of the injector for directly bypassing the fuel of the fuel pump to the fuel return line of the injector.

The detector may include a temperature sensor for measuring a temperature of a fuel in the fuel return line; and a pressure sensor for measuring a pressure of the fuel in the fuel return line.

Opening and closing of the fuel amount control valve is controlled by an engine control unit (ECU) based on the measured temperature and pressure of the detector.

The ECU receives the measured temperature of the temperature sensor and the measured pressure of the pressure sensor, and controls the fuel amount control valve to be opened, when gaseous fuel is to be changed into liquefied fuel, according to a result determined by using a liquefied-state determination map based on a temperature and a pressure.

The fuel amount control valve is opened when the measured temperature of the temperature sensor is higher than a predetermined value while the measured pressure of the pressure sensor corresponds to a predetermined pressure in the liquefied-state determination map.

The DME common-rail fuel supply apparatus may further include an auxiliary cooling device on the fuel return line between the injector and the fuel tank.

In another aspect of the present invention, a DME common-rail fuel supply method, may include performing key-on; starting up an engine; inputting a predetermined correlation values of temperature and pressure of DME fuel to an ECU to form a data map; determining a liquefied state according to the temperature and the pressure inside the data map of the ECU by comparing a measured temperature and a measured pressure with the predetermined correlation values; and maintaining a closing state of a fuel amount control valve fluid-connected to a fuel return line of an injector when a condition of the determining of the liquefied state is satisfied.

The DME common-rail fuel supply method may further include opening the fuel amount control valve when the condition of the determining of the liquefied state is not satisfied.

The DME common-rail fuel supply method may further include opening the fuel amount control valve when the measured temperature is higher than a predetermined temperature in the date map of ECU while the measured pressure corresponds to a predetermined temperature in the data map.

According to the exemplary embodiments of the present invention, the properties of the DME fuel may be actively maintained in a liquefied state, which makes it possible to improve the durability of the DME common-rail fuel supply apparatus.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
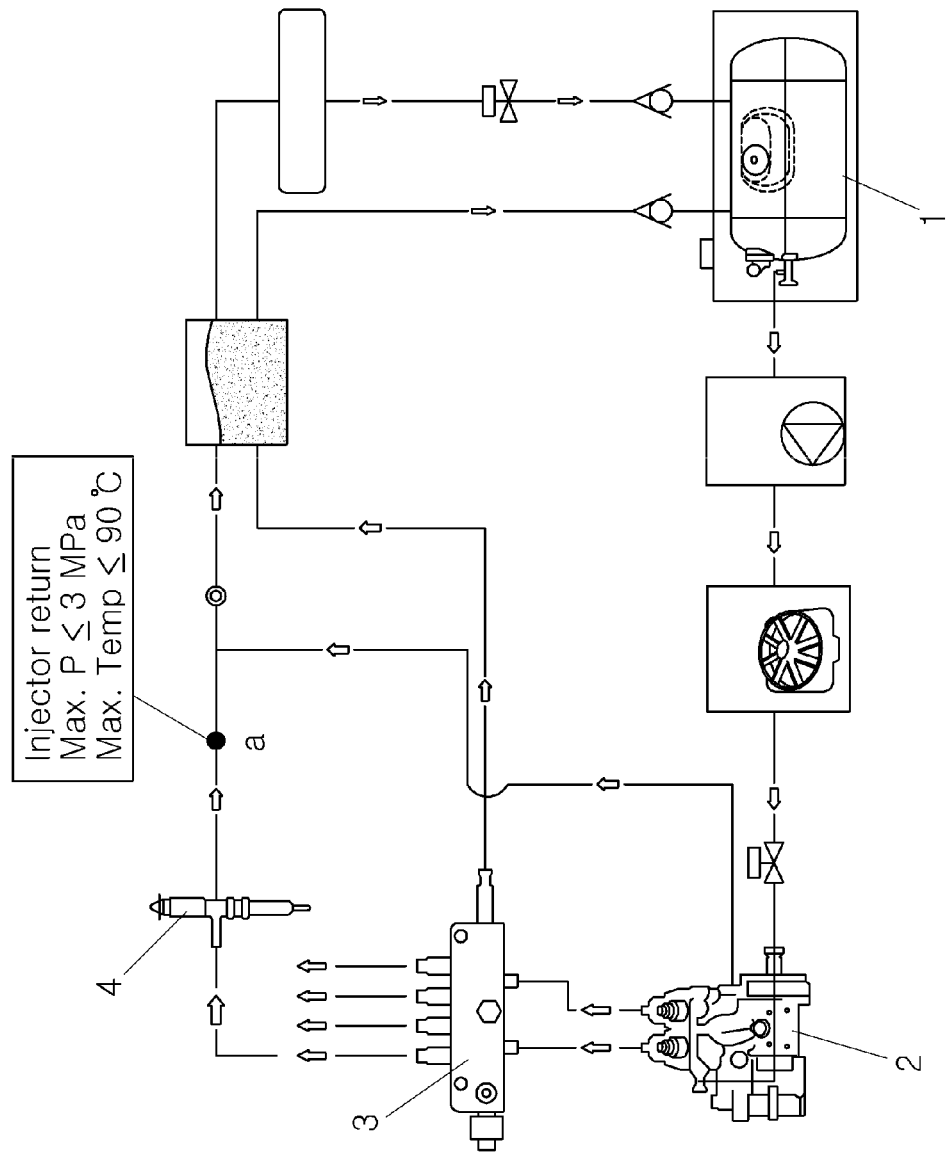
FIG. 1 schematically illustrates a DME common-rail fuel supply apparatus according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in more detail with reference to the accompanying drawings.

Figure 3:
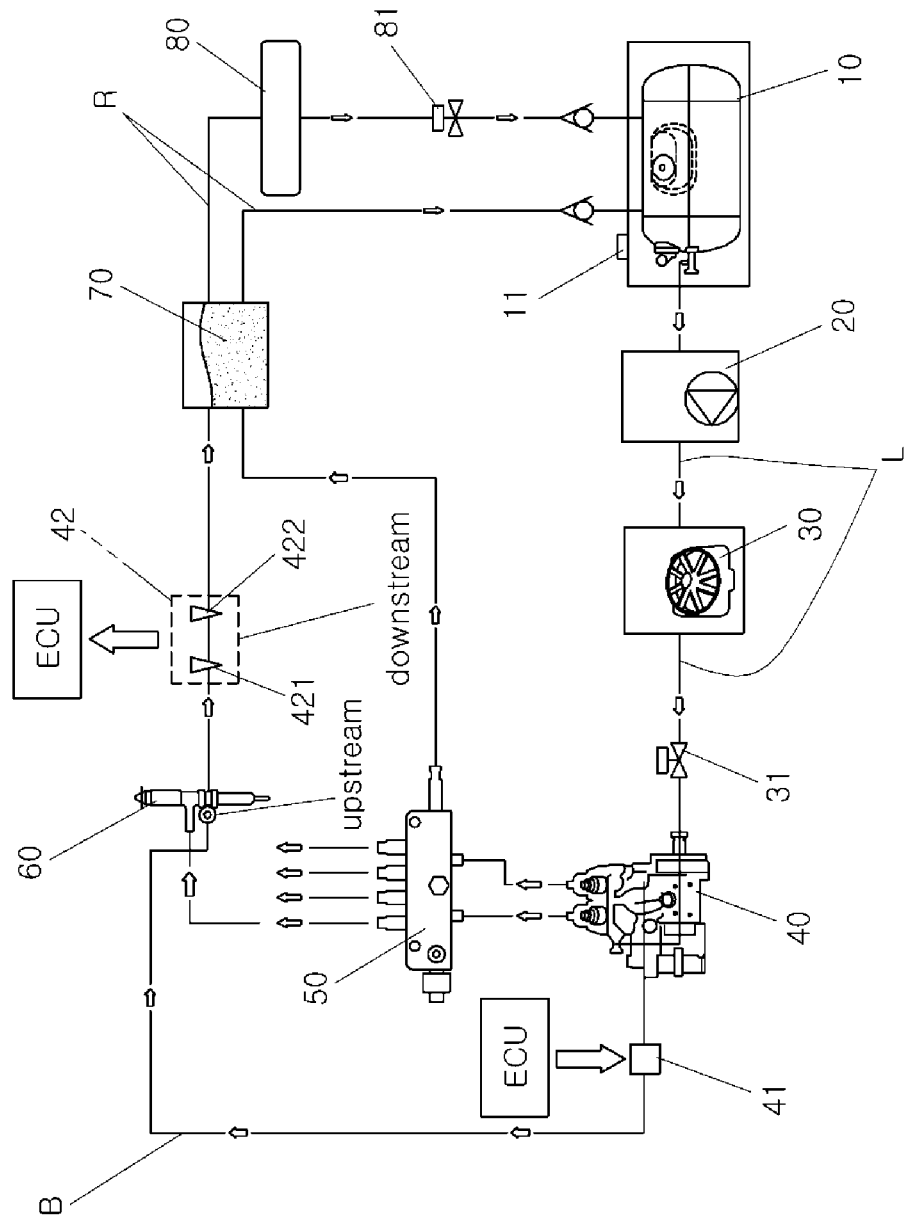
FIG. 3 schematically illustrates the structure of a DME common-rail fuel supply apparatus according to an exemplary embodiment of the present invention.

FIG. 3 schematically illustrates the structure of a DME common-rail fuel supply apparatus according to an exemplary embodiment of the present invention. As illustrated in FIG. 3, the DME common-rail fuel supply apparatus according to the exemplary embodiment of the present invention includes a fuel tank 10, a low-pressure pump 20, a cooling device 30, a fuel pump 40, a common-rail 50, an injector 60, and a fuel amount control valve 41.

Fuel tank 10 stores DME fuel, and low-pressure pump 20 is provided to transfer the DME fuel to a fuel supply line L. Fuel tank 10 may include a gas alarm 11 to detect whether the fuel leaks or not.

Then, the DME fuel stored in fuel tank 10 is transferred to cooling device 30 by low-pressure pump 20. Cooling device 30 serves to primarily lower the temperature of the DME fuel.

The DME fuel is passed to fuel pump 40 through cooling device 30. Fuel pump 40 generates a high pressure and simultaneously pumps the generated pressure to common rail 50 which will be described below. Common rail 50 maintains the pressure generated from fuel pump 40 and pumps the pressure to injector 60.

A bypass line B is formed in the fuel return line of the injector 60, and fuel amount control valve 41 is installed on bypass line B so as to control the fuel to be directly bypassed to the fuel return line of the injector 60 along bypass line B from fuel pump 40. The opening and closing of fuel amount control valve 41 is controlled by an engine control unit (ECU), based on a measured value of a detector 42 which will be described below.

Meanwhile, detector 42 is formed in the downstream side of injector 60. Detector 42 includes a temperature sensor 421 and a pressure senor 422 to measure the temperature and pressure of the DME fuel.

The ECU monitors values measured by temperature sensor 421 and pressure sensor 422 in real time, and controls the closing and opening of fuel amount control valve 41 based on the measure values.

The DME fuel passing through detector 42 may be returned to the fuel tank 10 through a fuel return line R. Here, fuel return line R may include an auxiliary cooling device 70 disposed thereon to secondarily cool down the DME fuel.

Figure 4:
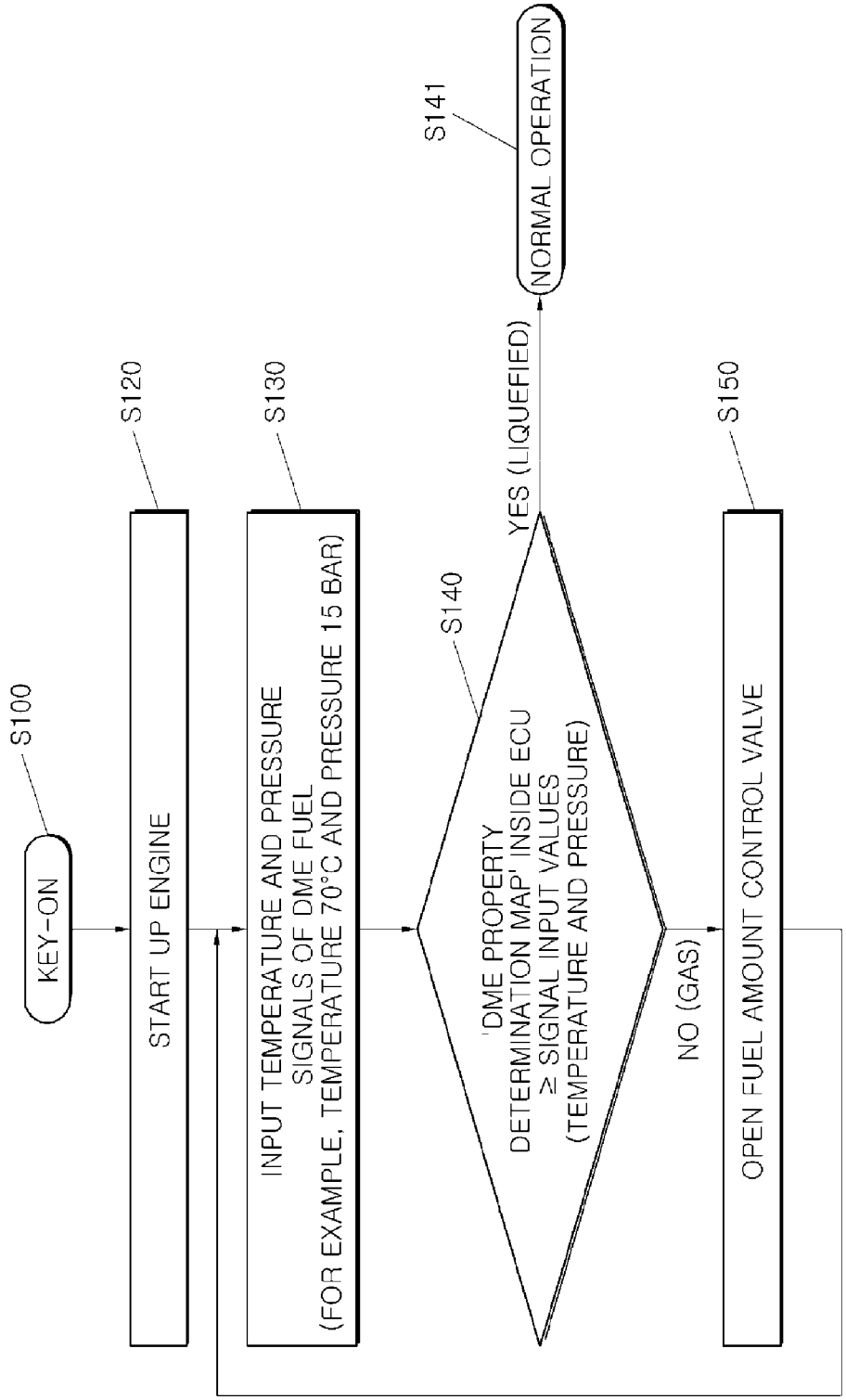
FIG. 4 is a flow chart showing a DME common-rail fuel supply method according to another exemplary embodiment of the present invention.

FIG. 4 is a flow chart showing a DME common-rail fuel supply method according to the exemplary embodiment of the present invention. As shown in FIG. 4, the process is started by performing key-on (S100). When the engine is started up (S120), preset values of temperature and pressure of DME fuel are inputted to the ECU (S130).

Figure 2:
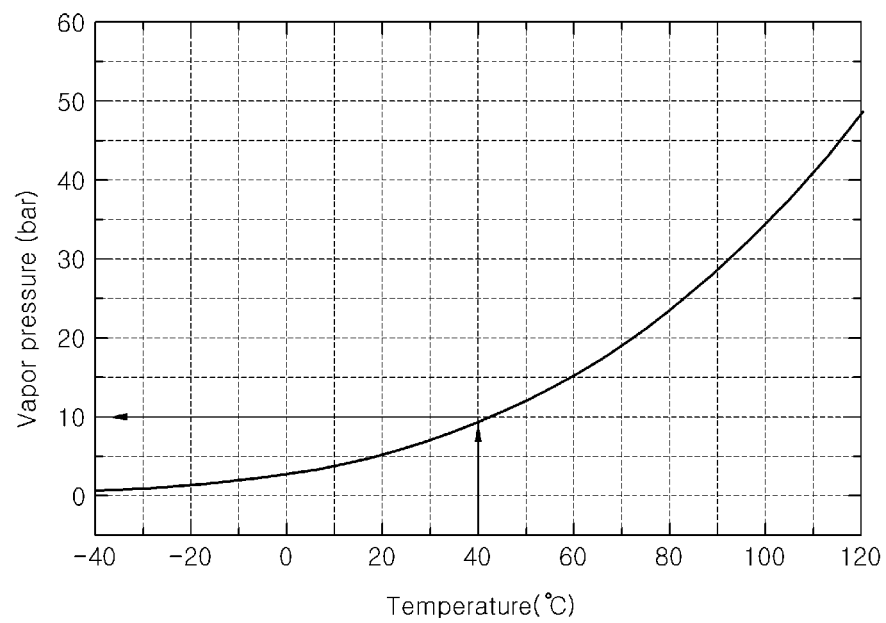
FIG. 2 is a general temperature-pressure curve of DME fuel.

Referring to FIG. 2 showing a DME temperature-pressure curve which may be typically applied inside the ECU, the properties of the DME are determined (S140). In this case, a map for determining a liquefied state according to the temperature and pressure at which the liquefied state of the DME fuel may be maintained may be inputted in an ECU control data form.

At the step S140, it is determined whether or not the temperature and pressure inputted from detector 42 are equal to or less than the DME temperature-pressure curve. When such a condition is satisfied, it is determined that the DME fuel maintains a liquefied state, and a normal operation is performed (S141).

On the other hand, when the condition of step S140 is not satisfied, it is determined that the DME fuel has been evaporated, and fuel amount control valve 41 is opened (S150).

In an exemplary embodiment of the present invention, the fuel amount control valve 41 is opened when the measured temperature by the detector 42 is higher than a predetermined temperature in the date map of ECU while the measured pressure corresponds to a predetermined pressure in the data map.

Figure 5:
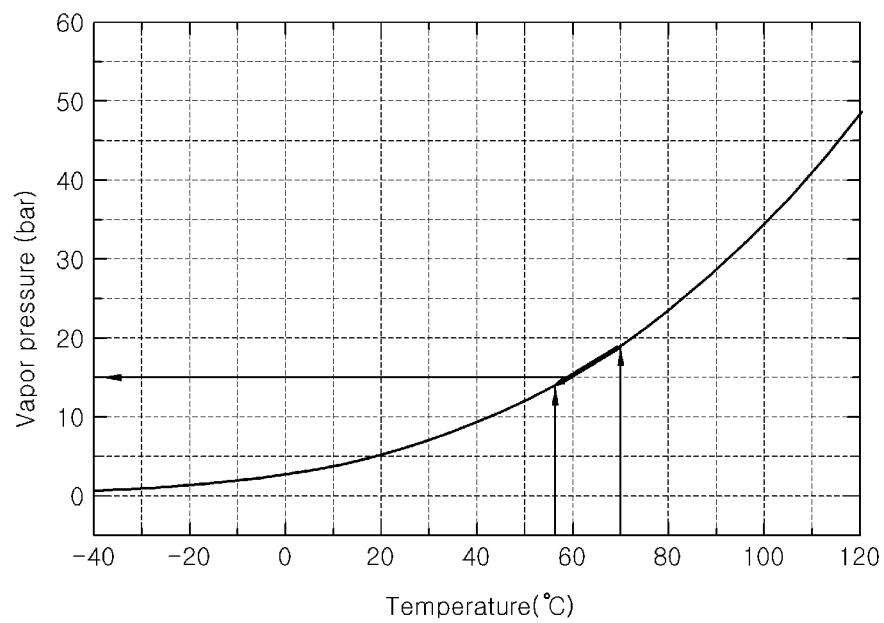
FIG. 5 is a temperature-pressure curve showing that the DME common-rail fuel supply apparatus according to the exemplary embodiment of the present invention is applied to lower the temperature and pressure of the DME fuel.

As described above, the ECU monitors a value measured by detector 42 in real time. When it is determined that the measured value is higher than the preset value, the fuel of fuel pump 40 is directly bypassed through fuel amount control valve 41 and directly supplied to the fuel return line of injector 60. That is, as low-temperature fuel is joined to a fuel gallery for returning residual fuel after injection of the injector 60, the fuel amount simultaneously increases. Therefore, the temperature decreases. Accordingly, as shown in FIG. 5, the temperature and pressure of the fuel decreases to suppress the evaporation of the DME fuel such that the DME fuel maintains a liquefied state.

Furthermore, while the fuel amount control valve 41 is opened, the fuel from the fuel pump 40 is bypassed to the auxiliary cooling device 70 through the bypass line B and the fuel return line R such that the fuel is further cooled.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A dimethyl ether (DME) common-rail fuel supply apparatus, comprising:
    a fuel pump fluid-connected to a fuel tank and a common rail and supplying DME fuel supplied via a fuel supply line from the fuel tank to the common rail;
    an injector receiving the DME fuel from the common rail and injecting the DME fuel at a predetermined pressure;
    a detector disposed on a fuel return line fluid-connecting the injector and the fuel tank to collect a fuel returned from the injector to the fuel tank, wherein the detector includes a temperature sensor for measuring a temperature of a fuel in the fuel return line and a pressure sensor for measuring a pressure of the fuel in the fuel return line;
    a bypass line fluid-connecting the fuel pump and the fuel return line of the injector for directly bypassing the fuel of the fuel pump to the fuel return line of the injector;
    a fuel amount control valve disposed on the bypass line for controlling an amount of the fuel to be bypassed; and
    an engine control unit (ECU) receiving the temperature and the pressure of the fuel measured in the fuel return line, using a liquefied-state determination map to determine whether the fuel is in a liquefied-state based on the measured temperature and the measured pressure in the fuel return line, and controlling to open the fuel amount control valve if it is determined that the fuel is not in the liquefied-state.

2. The DME common-rail fuel supply apparatus as defined in claim 1, wherein the fuel amount control valve is opened when the measured temperature of the temperature sensor is higher than a predetermined value while the measured pressure of the pressure sensor corresponds to a predetermined pressure in the liquefied-state determination map.

3. The DME common-rail fuel supply apparatus as defined in claim 1, further including an auxiliary cooling device on the fuel return line between the injector and the fuel tank.

* * * * *

UNITED STATES PATENT AND TRADEMARK OFFICE
CERTIFICATE OF CORRECTION

| | | |
|---|---|---|
| PATENT NO. | : 9,140,226 B2 | Page 1 of 1 |
| APPLICATION NO. | : 13/528157 | |
| DATED | : September 22, 2015 | |
| INVENTOR(S) | : Sangil Yoon | |

It is certified that error appears in the above-identified patent and that said Letters Patent is hereby corrected as shown below:

On the title page, under "(30) Foreign Application Priority Data", please delete "Nov. 20, 2011" and insert therefor: -- Nov. 15, 2011 --.

The foreign priority information should now correctly read as follows:

(30) Foreign Application Priority Data:

--Nov. 15, 2011 (KR) ...................... 10-2011-0119071--

Signed and Sealed this
Twenty-second Day of March, 2016

Michelle K. Lee
*Director of the United States Patent and Trademark Office*